US010339385B1

(12) United States Patent
Truong et al.

(10) Patent No.: US 10,339,385 B1
(45) Date of Patent: Jul. 2, 2019

(54) DETERMINING AN ACTION OF A CUSTOMER IN RELATION TO A PRODUCT

(71) Applicant: Capital One Services, LLC., McLean, VA (US)

(72) Inventors: Anh Truong, Champaign, IL (US); Kenneth Taylor, Champaign, IL (US); Vincent Pham, Champaign, IL (US); Fardin Abdi Taghi Abad, Champaign (IL); Jeremy Goodsitt, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/125,029

(22) Filed: Sep. 7, 2018

(51) Int. Cl.
*H04N 7/18* (2006.01)
*G06K 9/00* (2006.01)
*G06Q 30/02* (2012.01)
*G10L 15/26* (2006.01)
*G06F 3/01* (2006.01)
*H04W 4/35* (2018.01)

(52) U.S. Cl.
CPC ......... *G06K 9/00718* (2013.01); *G06F 3/013* (2013.01); *G06Q 30/0201* (2013.01); *G10L 15/265* (2013.01); *H04W 4/35* (2018.02)

(58) Field of Classification Search
CPC ..... G06K 9/00718; H04W 4/35; G06F 3/013; G06Q 30/0201; G10L 15/265
USPC ....................................................... 348/150
See application file for complete search history.

(56) References Cited

U.S. PATENT DOCUMENTS

| 7,389,914 B1 * | 6/2008 | Enright ................ G06Q 20/042 235/379 |
| 7,516,888 B1 | 4/2009 | Kundu et al. |
| 10,162,956 B1 * | 12/2018 | Truong .................... G06F 21/36 |
| 10,198,924 B1 * | 2/2019 | Pham .................... G08B 15/001 |
| 2007/0276841 A1 * | 11/2007 | Rhoads .................... G06F 3/017 |
| 2008/0018738 A1 * | 1/2008 | Lipton ............... G06K 9/00771 348/143 |

(Continued)

OTHER PUBLICATIONS

Dahl, "This Technology Makes It Possible to A/B Test Brick-and-Mortar Stores", https://contently.com/2014/11/14/this-technology-makes-it-possible-to-ab-test-brick-and-mortar-stores/, Nov. 14, 2014, 6 pages.

(Continued)

*Primary Examiner* — Shan E Elahi
(74) *Attorney, Agent, or Firm* — Harrity & Harrity, LLP

(57) ABSTRACT

A device receives video data concerning a plurality of customers and a product in a plurality of physical retail locations. The device processes the video data and determines actions of the plurality of customers in relation to the product in the plurality of physical retail locations, by: determining, for a customer of the plurality of customers, an activity of the customer in relation to the product, and determining, for the customer, an eye gaze direction of the customer relative to the product. The device determines categories for the actions of the plurality of customers in relation to the product. The device generates a report that indicates one or more of the categories for the actions of the plurality of customers in relation to the product and sends the report to a client device to permit the client device to display the report.

20 Claims, 11 Drawing Sheets

(56) References Cited

U.S. PATENT DOCUMENTS

| | | | | |
|---|---|---|---|---|
| 2012/0078700 A1* | 3/2012 | Pugliese, III | .......... | G06Q 30/02 |
| | | | | 705/14.25 |
| 2012/0235883 A1* | 9/2012 | Border | ............... | G02B 27/0093 |
| | | | | 345/8 |
| 2013/0182114 A1* | 7/2013 | Zhang | ..................... | H04N 7/18 |
| | | | | 348/150 |
| 2016/0012465 A1* | 1/2016 | Sharp | ..................... | G06Q 20/18 |
| | | | | 705/14.17 |

OTHER PUBLICATIONS

Prism, "Video and the Internet of Things-Solving the Brick-and-Mortar Challenge", https://prism.com/wp-content/uploads/2016/04/Prism_VideoInternetOfThingsWhitepaper-1.pdf, Sep. 7, 2018 (Print Date), 6 pages.

RetailNext, Inc., "The most advanced in-store analytics solution available.", Sep. 7, 2018 (Print Date), 4 pages.

\* cited by examiner

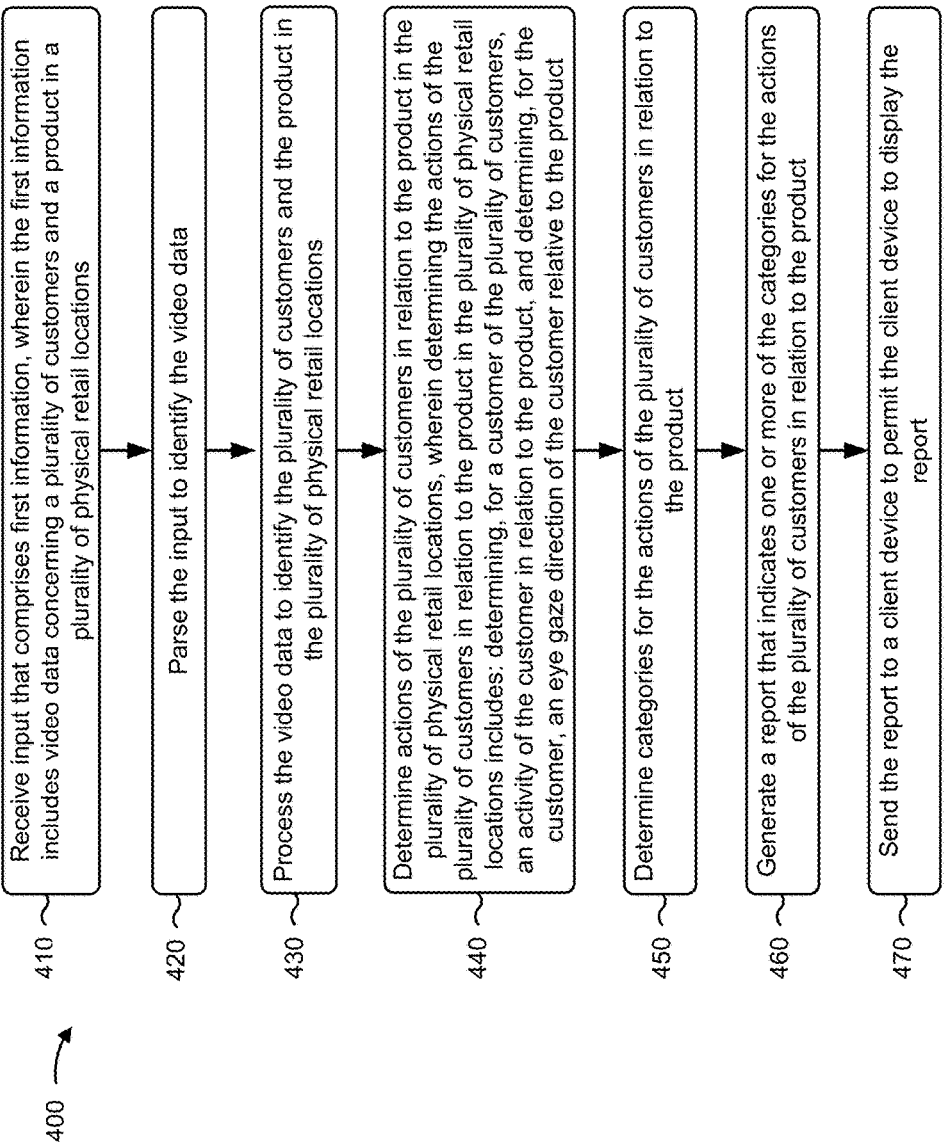

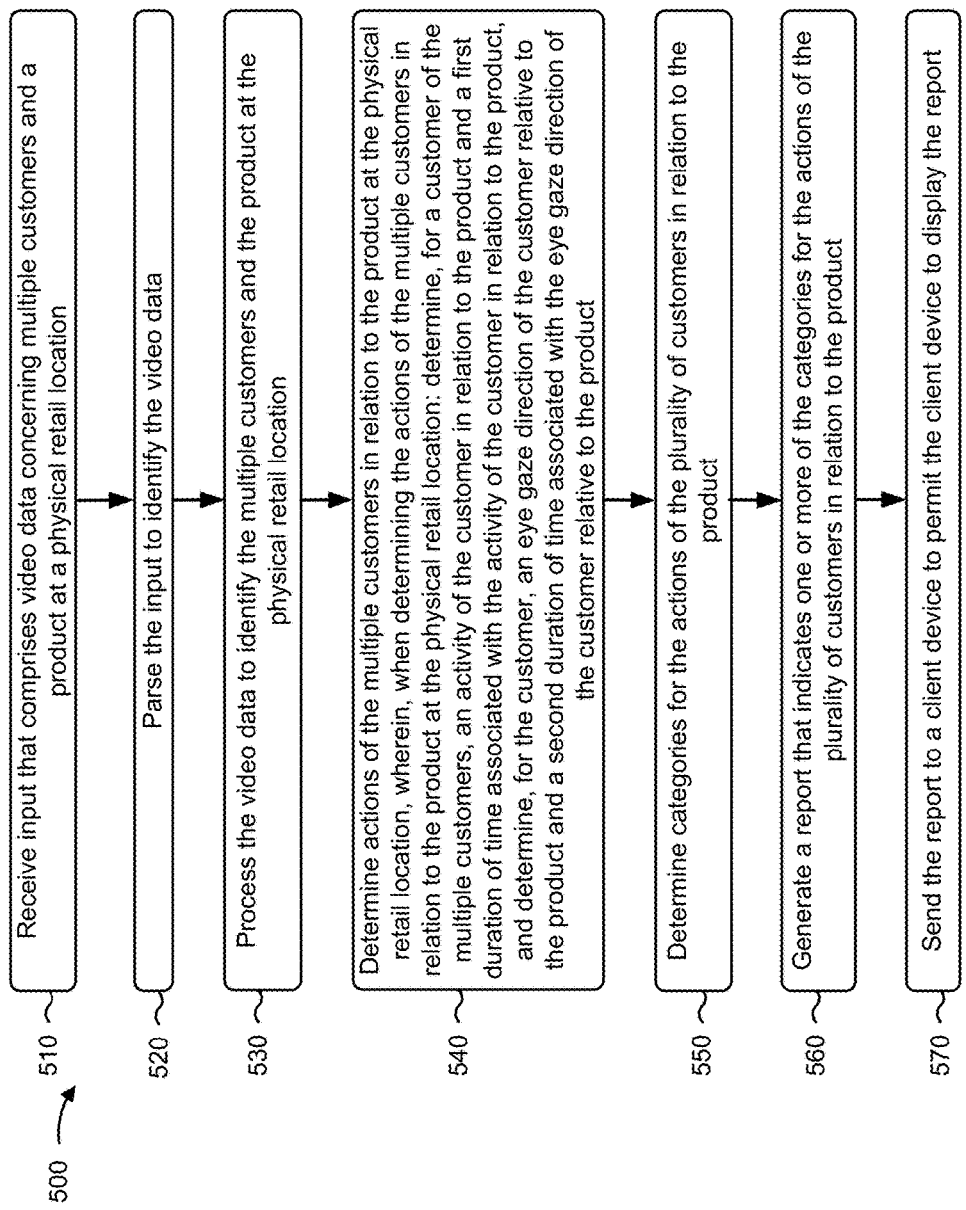

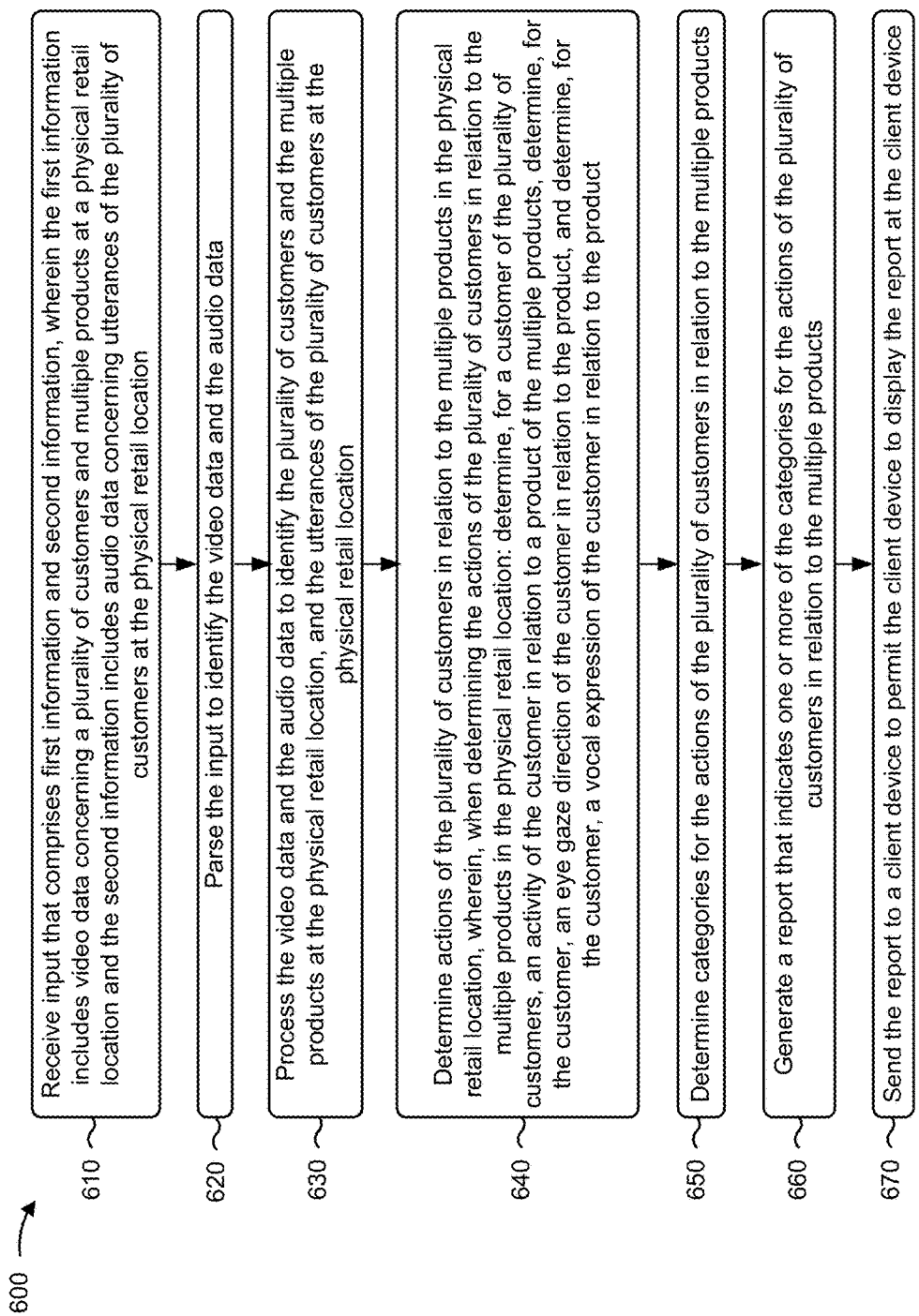

DETERMINING AN ACTION OF A CUSTOMER IN RELATION TO A PRODUCT

BACKGROUND

A camera device may capture and/or record image data, video data, and/or audio data concerning a person and an object at a location. The image data, video data, and/or audio data may include information concerning an action of the person in relation to the object at the location.

SUMMARY

According to some implementations, a method may include receiving, by a device, input that comprises first information, wherein the first information includes video data concerning a plurality of customers and a product in a plurality of physical retail locations. The method may include parsing, by the device, the input to identify the video data and processing, by the device, the video data to identify the plurality of customers and the product in the plurality of physical retail locations. The method may include determining, by the device, actions of the plurality of customers in relation to the product in the plurality of physical retail locations wherein determining the actions of the plurality of customers in relation to the product in the plurality of physical retail locations includes: determining, for a customer of the plurality of customers, an activity of the customer in relation to the product, and determining, for the customer, an eye gaze direction of the customer relative to the product. The method may include determining, by the device, categories for the actions of the plurality of customers in relation to the product. The method may include generating, by the device, a report that indicates one or more of the categories for the actions of the plurality of customers in relation to the product, and sending, by the device, the report to a client device to permit the client device to display the report.

According to some implementations, a device may include one or more memory devices, and one or more processors, communicatively coupled to the one or more memory devices, to receive input that comprises video data concerning multiple customers and a product at a physical retail location. The one or more processors may parse the input to identify the video data and process the video data to identify the multiple customers and the product at the physical retail location. The one or more processors may determine actions of the multiple customers in relation to the product at the physical retail location, wherein, when determining the actions of the multiple customers in relation to the product at the physical retail location, the one or more processors are to: determine, for a customer of the multiple customers, an activity of the customer in relation to the product and a first duration of time associated with the activity of the customer in relation to the product, and determine, for the customer, an eye gaze direction of the customer relative to the product and a second duration of time associated with the eye gaze direction of the customer relative to the product. The one or more processors may determine categories for the actions of the multiple customers in relation to the product. The one or more processors may generate a report that indicates one or more of the categories for the actions of the multiple customers in relation to the product, and send the report to a client device to permit the client device to display the report at the client device.

According to some implementations, a non-transitory computer-readable medium may store instructions that include one or more instructions that, when executed by one or more processors of a device, cause the one or more processors to receive input that comprises first information and second information, wherein the first information includes video data concerning a plurality of customers and multiple products at a physical retail location and the second information includes audio data concerning utterances of the plurality of customers at the physical retail location. The one or more instructions may cause the one or more processors to parse the input to identify the video data and the audio data and process the video data and the audio data to identify the plurality of customers and the multiple products at the physical retail location, and the utterances of the plurality of customers at the physical retail location. The one or more instructions may cause the one or more processors to determine actions of the plurality of customers in relation to the multiple products in the physical retail location, wherein the one or more instructions, that cause the one or more processors to determine the actions of the plurality of customers in relation to the multiple products in the physical retail location, cause the one or more processors to: determine, for a customer of the plurality of customers, an activity of the customer in relation to a product of the multiple products, determine, for the customer, an eye gaze direction of the customer in relation to the product, and determine, for the customer, a vocal expression of the customer in relation to the product. The one or more instructions may cause the one or more processors to determine categories for the actions of the plurality of customers in relation to the multiple products. The one or more instructions may cause the one or more processors to generate a report that indicates one or more of the categories for the actions of the plurality of customers in relation to the multiple products, and send the report to a client device to permit the client device to display the report at the client device.

BRIEF DESCRIPTION OF THE DRAWINGS

FIG. 4 is a flow chart of an example process for determining an action of a customer in relation to a product.

FIG. 5 is a flow chart of an example process for determining an action of a customer in relation to a product.

FIG. 6 is a flow chart of an example process for determining an action of a customer in relation to a product.

DETAILED DESCRIPTION

Figure 1A:
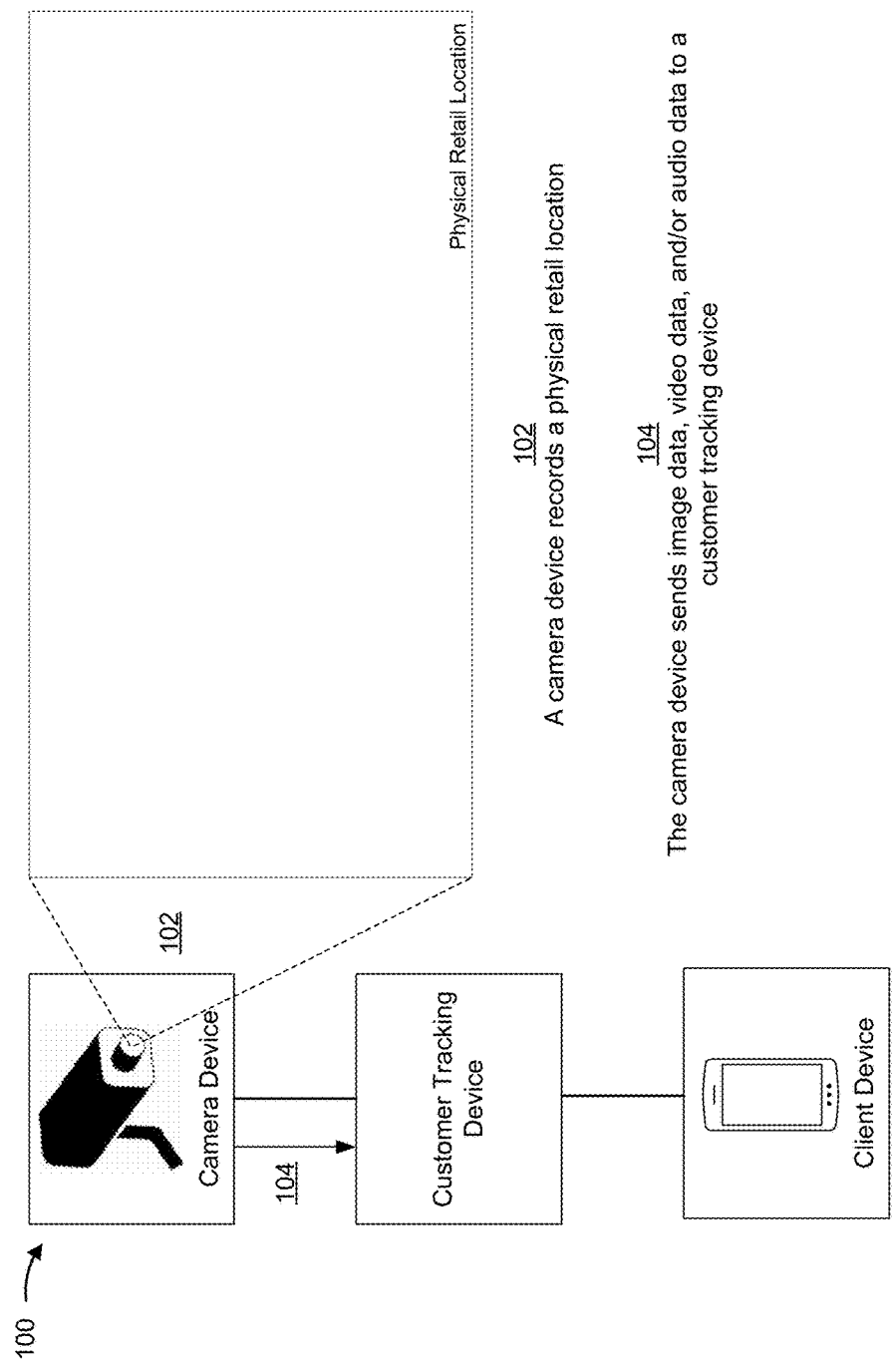
FIGS. 1A-1F are diagrams of example implementations described herein.

The following detailed description of example implementations refers to the accompanying drawings. The same reference numbers in different drawings may identify the same or similar elements.

A customer may shop for one or more products at a physical retail location. The customer may buy a product based on one or more factors, such as the customer's desire to buy the product, the customer's familiarity with the product, the labeling of the product, the packaging of the product, the placement of the product in an aisle and/or on a shelf, the price of the product, and/or the like. In some cases, a retailer may be able to analyze point-of-sale information regarding the product to determine customers' opinions regarding the product. However, the retailer may not be able to discern in detail how the one or more factors affect the customers' opinions.

Some implementations described herein provide a customer tracking device that is capable of processing image data, video data, and/or audio data (e.g., received from a camera device) concerning a customer and a product at a physical retail location to determine an action of the customer in relation to the product while the customer is shopping at the physical retail location. In some implementations, the customer tracking device may determine an activity of the customer in relation to the product (e.g., how the customer physically moves in relation to the product), an eye gaze direction of the customer in relation to the product (e.g., whether the customer looks at the product), and/or a vocal expression of the customer in relation to the product (e.g., whether the customer talks about the product) to determine the action of the customer in relation to the product. In some implementations, the customer tracking device may be able to determine the actions of multiple customers in relation to multiple products, at one or more physical retail locations, at the same time. In some implementations, the customer tracking device may generate a report that categorizes actions of the multiple customer in relation to the multiple products. In some implementations, the customer tracking device may send the report to a client device, where a user may use the report to analyze the customers' behavior. In some implementations, the client device may process the report to generate recommendations regarding the multiple products, such as which of the multiple products to reorder, which of the multiple products to place where, which of the multiple products to stop ordering, and/or the like.

In this way, implementations described herein enable a retailer to gather granular data on how customers engage with products at physical retail locations, regardless of whether the customers purchase the products. In this way, retailers may adjust characteristics of a product's labeling, packaging, advertising, security features, placement, and/or the like to determine how to increase customer engagement with the product. For example, a retailer may be able perform AB testing on a product, where the retailer may present different versions of a product at two or more locations and the customer tracking device generates a report that categorizes actions of customers in relation to the product at the two or more locations. The retailer may analyze the reports to determine which version of the product is more desirable to the customers.

In this way, the process for determining actions of multiple customers in relation to multiple products at multiple physical retail locations is automated and the customer tracking device may determine numerous (e.g., hundreds, thousands, millions, and/or the like) actions at the same time. This may improve speed and efficiency of the process and conserve computing resources (e.g., processor resources, memory resources, and/or the like) of the customer tracking device. Furthermore, implementations described herein use a rigorous, computerized process to perform tasks or roles that were not previously performed or were previously performed using subjective human intuition or input. For example, currently there does not exist a technique to automatically determine actions of multiple customers in relation to multiple products at multiple physical retail locations. Finally, automating the process for determining actions of multiple customers in relation to multiple products at multiple physical retail locations conserves computing resources (e.g., processor resources, memory resources, and/or the like) that would otherwise be wasted in attempting to assist a human in determining actions of multiple customers in relation to multiple products at multiple physical retail locations by hand.

FIGS. 1A-1F are diagrams of example implementations 100 described herein.

As shown in FIG. 1A, implementation 100 may include a camera device, a customer tracking device, and a client device. In some implementations, the camera device may be a camera, a still camera, a video camera, a video camera with a microphone, a device in communication with a camera, and/or a device for receiving image data, video data, and/or audio data, such as a server. In some implementations, the customer tracking device may be a personal computer, a server computer, a cloud computing platform, and/or the like. In some implementations, the client device may be a communication and/or computing device, such as a mobile phone, a smartphone, a laptop computer, a tablet computer, and/or the like. In some implementations, the camera device, the customer tracking device, and the client device may be connected to a network and may communicate via the network.

As shown by reference number 102, a camera device captures and/or records at a physical retail location. In some implementations, the physical retail location may be a store (e.g., a department store, a shoe store, a home goods store, a drug store, a grocery store, a liquor store, a post office, a gift shop, and/or the like), a restaurant, a location that offers one or more products for sale, and/or the like. In some implementations, the camera device may include a camera that captures and/or records image data, video data, and/or audio data at the physical retail location. For example, the camera device may be a camera located in a section of a retail store and the camera device captures and records video data and audio data related to one or more products and/or one or more customers in the section of the retail store that is viewable by the camera of the camera device. In some implementations, the camera device may be connected to multiple cameras to receive and/or record image data, video data, and audio data captured by the multiple cameras. For example, the camera device may be a server located at a retail store that is connected to multiple cameras that are located at multiple locations of the retail store. The camera device may receive and/or record video data related to one or more products and/or one or more customers that are viewable by the multiple cameras.

As shown by reference number 104, the camera device may send the image data, the video data, and/or the audio data to the customer tracking device. In some implementations, the camera device may send the image data, the video data, and/or the audio data in real time (e.g., as the image data, the video data, and/or the audio data are captured and/or recorded by the camera device). In some implementations, the camera device may send one or more files that include the image data, the video data, and/or the audio data to the customer tracking device at a specific time or on a schedule (e.g., every hour, every day, every week, and/or the like).

Figure 1B:
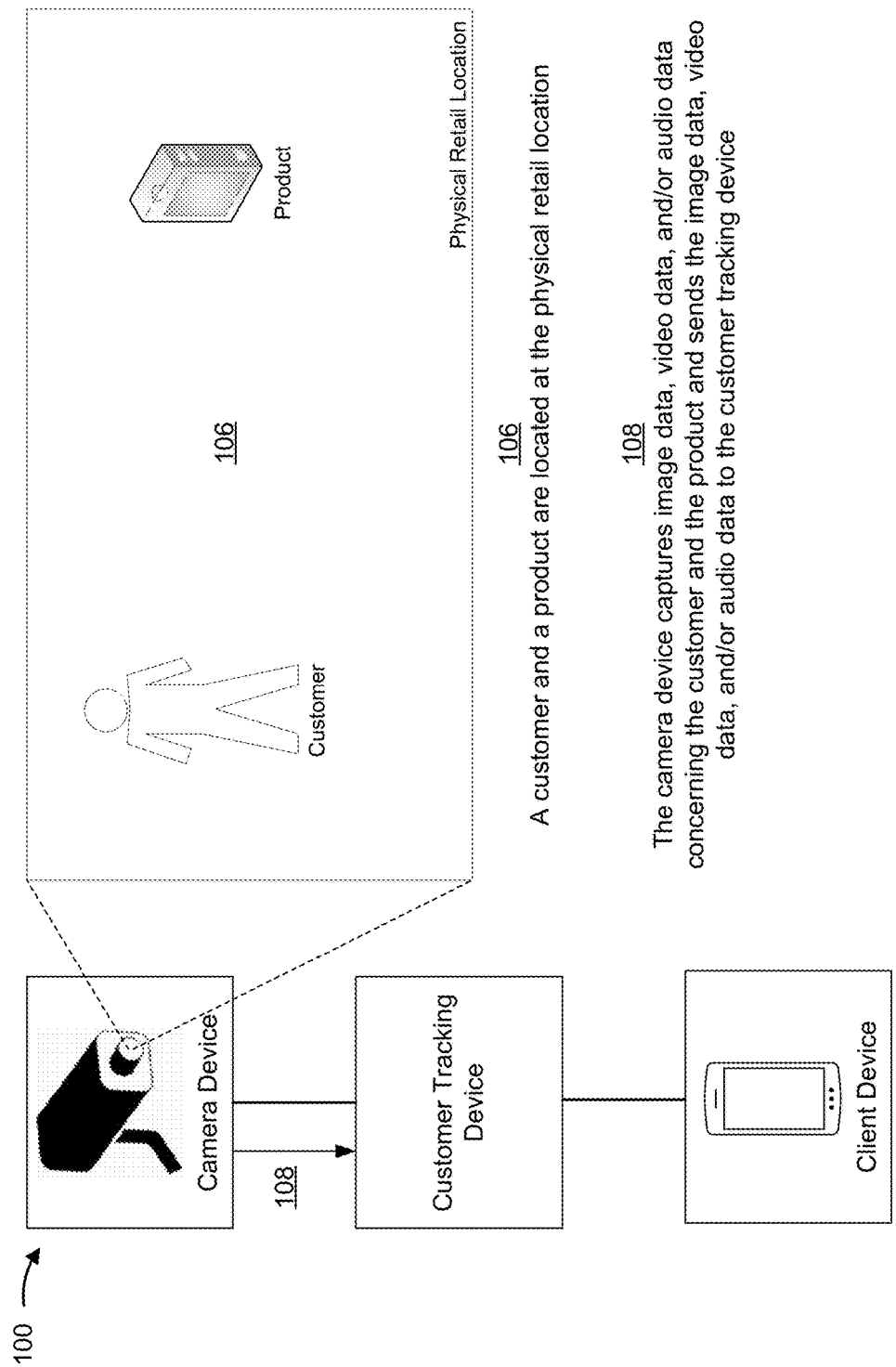

As shown in FIG. 1B and by reference number 106, a customer and/or a product may be located at the physical retail location. For example, a customer and a product may be located in an aisle of a grocery store. In some implementations, the customer may be a human being shopping for the product at the physical retail location. In some implementations, the product may be a physical object for sale at the physical retail location. In some implementations, the product may include packaging (e.g., a box, a tin, a bottle, a jug, a pack, a bag, and/or the like), labeling (e.g., a product brand, nutrition information, pictures, text, symbols, certification symbols, trademarks, bar codes, universal product codes (UPC), and/or the like), advertising (e.g., an attached coupon, a rebate code, and/or the like), security features (e.g., tamper resistant features, pilferage prevention features, anti-theft features, anti-counterfeiting features, authentication features, tracking features, and/or the like).

In some implementations, one or more customers and/or one or more products may be located at the physical location. For example, multiple customers and multiple products may be located in an aisle of a grocery store. In some implementations, one or more customers and/or one or more products may be located at one or more physical retail locations. For example, multiple customers and multiple products may be located in multiple aisles of a grocery store and/or multiple grocery stores. In some implementations, the camera device may capture and/or record the image data, the video data, and/or the audio data related to the one or more customers and/or one or more products located at the one or more physical retail locations by employing one or more cameras and/or the like. For example, a headquarters of a chain of grocery stores may employ a camera device that receives image data, video data, and/or audio data captured by multiple cameras at each grocery store of the chain of grocery stores to monitor multiple customers and multiple products at the chain of grocery stores.

For clarity, the figures and this description provide examples of some implementations that focus on scenarios that include a customer and a product at a physical retail location, but the figures and this description are applicable to implementations that include one or more customers and one or more products at one or more physical retail locations. For example, the camera device may capture and/or record image data, video data, and/or audio data concerning the one or more retail locations, where the image data, the video data, and/or the audio data includes information concerning the one or more customers and the one or more products, as well as one or more other objects (e.g., shelves, shopping carts, light fixtures, and/or the like). The customer tracking device, as described in detail below, may process the image data, the video data, and/or the audio data to identify the one or more customers in relation to the one or more products and determine actions of the one or more customers in relation to the one or more products at the same time.

As shown by reference number 108, the camera device may receive and/or capture image data, video data, and/or audio data concerning the customer and the product at the physical retail location. In some implementations, the camera device may send the image data, the video data, and/or the audio data to the customer tracking device.

In some implementations, the customer tracking device may receive the image data, the video data, and/or the audio data. In some implementations, the customer tracking device may receive input that comprises the image data, the video data, and/or the audio data. In some implementations, the input may comprise first information and/or second information. In some implementations, the first information may include the image data and/or the video data. In some implementations, the second information may include the audio data, which may include one or more utterances of the customer at the physical retail location.

Figure 1C:
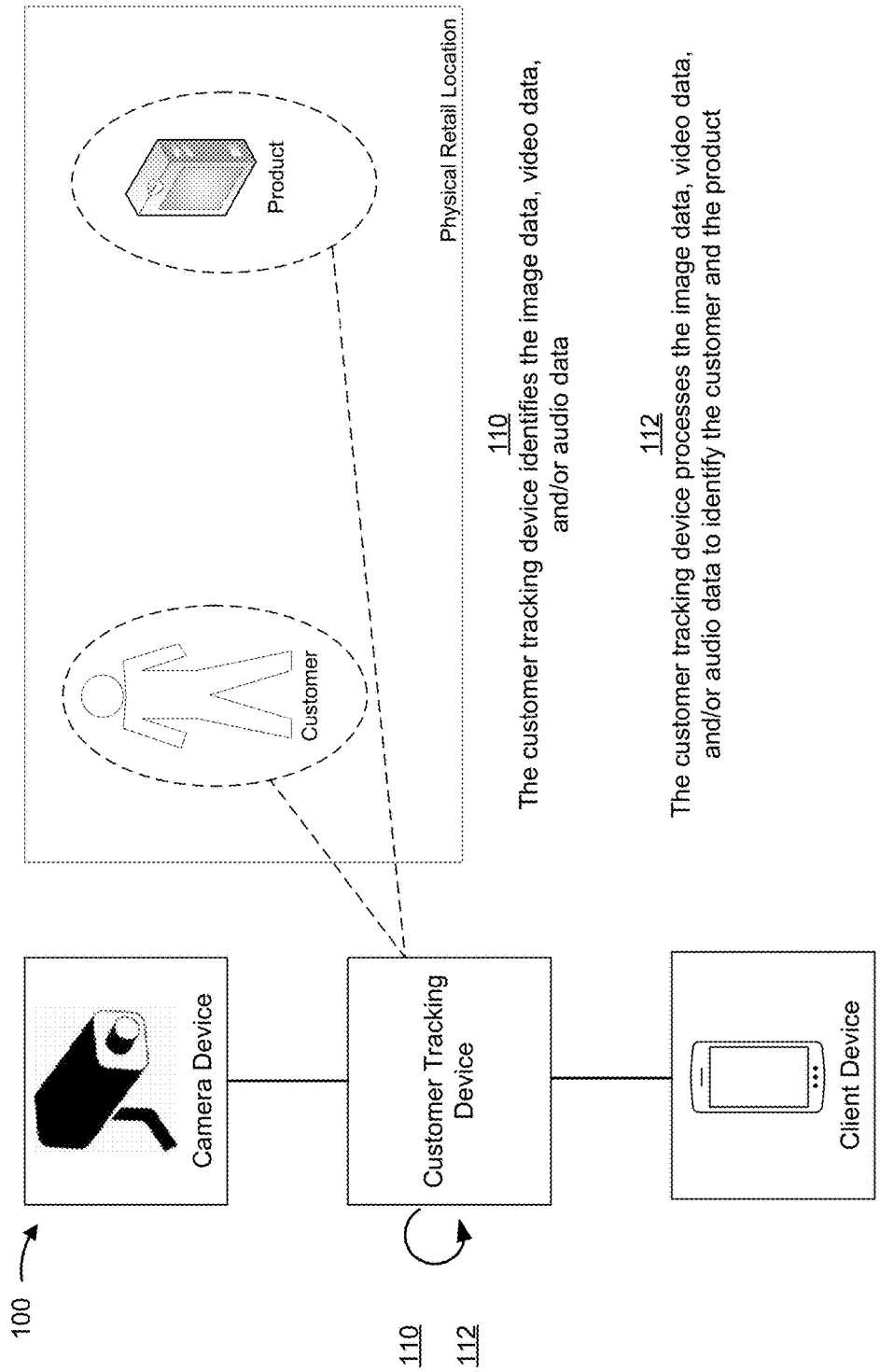

As shown in FIG. 1C and by reference number 110, the customer tracking device may parse the input to identify the image data, the video data, and/or the audio data. In some implementations, the customer tracking device may parse the input based on the format of the input to identify the image data, the video data, and/or the audio data. For example, where the input comprises first information and second information, the customer tracking device may recognize and parse the first information to identify the image data and/or the video data and recognize and parse the second information to identify the audio data.

As shown by reference number 112, the customer tracking device may process the image data, the video data, and/or the audio data to identify the customer and/or the product at the physical retail location. For example, the customer tracking device may process the image data, which shows the customer standing in an aisle of a grocery store and the product set on a shelf in the aisle of the grocery store, to identify the customer and the product. In some implementations, the customer tracking device may process the image data, the video data, and/or the audio data to identify the customer, the product, and/or the one or more utterances of the customer. For example, the customer tracking device may process the video data, which shows the lips of the customer moving, and the audio data, which indicates that the customer is saying words, to identify the customer and the one or more utterances of the customer.

Figure 1D:
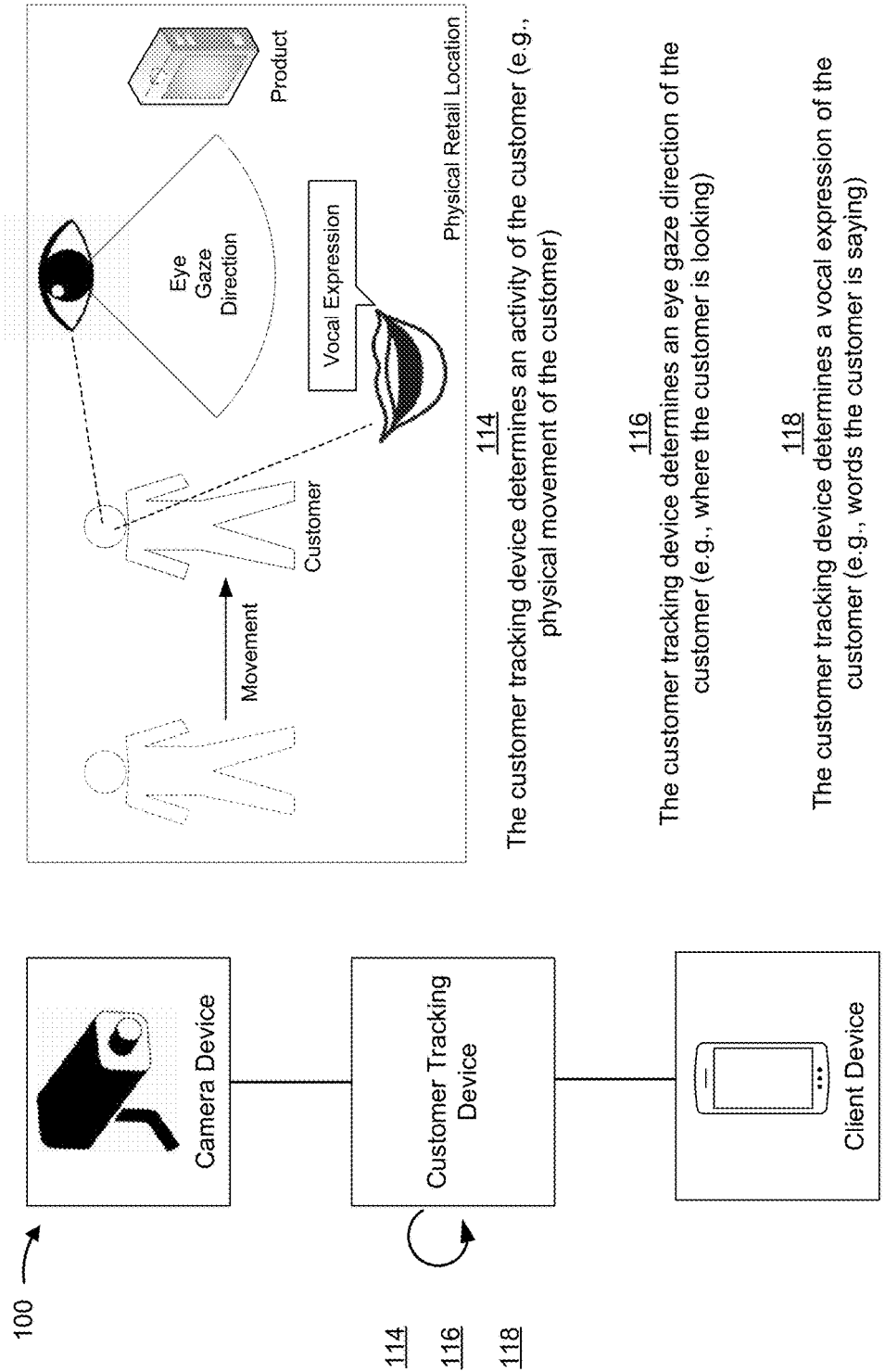

As shown in FIG. 1D, the customer tracking device may monitor how the customer engages with the product by processing the image data, the video data, and/or the audio data. As shown by reference number 114, the customer tracking device may determine an activity of the customer in relation to the product. For example, the customer tracking device may determine that the customer picks up and holds the product. In some implementations, the activity of the customer may include touching the product, picking up the product from a shelf, putting the product back on the shelf, turning the product on the shelf, putting the product in a shopping cart/and or basket, picking up the product and holding the product next to another product, and/or the like.

In some implementations, the customer tracking device may determine the activity of the customer by identifying one or more body parts of the customer and tracking movement of the one or more body parts. For example, the customer tracking device may identify and track an arm, hand, fingers, and/or the like of the customer and, based on the movement of the arm, hand, fingers, and/or the like of the customer in relation to the product, determine that the customer picks up and holds the product. The customer tracking device does not determine the identity of the customer. In some implementations, the customer tracking device identifies the one or more body parts of the customer as belonging to an anonymous customer.

In some implementations, the customer tracking device may use a body motion and classification algorithm to identify and track the one or more body parts of the customer and determine the activity of the customer in relation to the product. In some implementations, the customer tracking device may identify and track the one or more body parts of the customer and determine the activity of the customer in relation to the product by using one or more computer vision techniques (e.g., a scale-invariant feature transform (SIFT) technique, a speeded up robust features (SURF) technique, a generalized robust invariant feature (G-RIF) technique, and/or the like).

In some implementations, the customer tracking device may determine an amount of time (e.g., a first duration of time) associated with the activity of the customer in relation to the product. In some implementations, the customer tracking device may determine the first duration of time based on the movement of the one or more body parts of the customer for a period of time. For example, the customer tracking device may determine that it took a specific amount of time for a customer to pick up a product and place the product in a shopping cart based on the movement of the customer's arm, hand, and/or fingers.

In some implementations, the customer tracking device may simultaneously determine one or more activities of one or more customers in relation to one or more products at one or more physical retail locations. For example, the customer tracking device may determine the one or more activities of the one or more customers in relation to the one or more products at the one or more physical retail locations by identifying one or more body parts of the one or more customers, respectively, and tracking movement of the one or more body parts of the one or more customers at the same time.

As shown by reference number 116, the customer tracking device may determine an eye gaze direction of the customer relative to the product. For example, the customer tracking device may determine that the eye gaze direction of the customer is pointed toward the product. In some implementations, the customer tracking device may determine the eye gaze direction of the customer by identifying one or more eyes of the customer and tracking movement of the one or more eyes. For example, the customer tracking device may identify and track movement of one or more eyes of the customer and, based on the movement of the one or more eyes (e.g., movement of an iris of the one or more eyes), determine that the eye gaze direction of the customer is pointed toward the product. In some implementations, the customer tracking device may use an eye motion and classification algorithm to identify and track movement of the one or more eyes of the customer and determine the eye gaze direction of the customer relative to the product.

In some implementations, the customer tracking device may determine the eye gaze direction of the customer by identifying one or more body parts of the customer and tracking movement of the one or more body parts. For example, the customer tracking device may identify a nose of the customer and, based on the movement of the nose relative to the product, determine that the eye gaze direction of the customer is pointed toward the product because the nose of the customer is pointed toward the product. In some implementations, the customer tracking device may use a body motion and classification algorithm to identify and track the one or more body parts of the customer and determine the eye gaze direction of the customer in relation to the product. In some implementations, the customer tracking device may identify and track the one or more body parts of the customer and determine the eye gaze direction of the customer in relation to the product by using one or more computer vision techniques (e.g., a SIFT technique, a SURF technique, a G-RIF technique, and/or the like).

In some implementations, the customer tracking device may determine an amount of time (e.g., a second duration of time) associated with the eye gaze direction of the customer relative to the product. In some implementations, the customer tracking device may determine the second duration of time based on the movement of the one or more eyes or one or more body parts of the customer for a period of time. For example, the customer tracking device may determine that the eye gaze direction of the customer was pointed at the product for a specific amount of time based on the movement of the customer's one or more eyes or one or more body parts.

In some implementations, the customer tracking device may simultaneously determine one or more eye gaze directions of one or more customers in relation to one or more products at one or more physical retail locations. For example, the customer tracking device may determine the one or more eye gaze directions of the one or more customers in relation to the one or more products at the one or more physical retail locations by identifying one or more eyes and/or one or one or more body parts of the one or more customers, respectively, and tracking movement of the one or more eyes and/or the one or more body parts of the one or more customers.

As shown by reference number 118, the customer tracking device may determine a vocal expression of the customer in relation to the product. For example, the customer tracking device may determine that the mouth of the customer makes a sound while the customer holds the product. In some implementations, the vocal expression may indicate a desire to buy the product, a desire to avoid buying the product, a reaction to the packaging, labeling, advertising, and/or security features of the production, and/or the like.

In some implementations, the customer tracking device may determine the vocal expression of the customer in relation to the product by identifying one or more words spoken by the customer in relation to the product. For example, the customer tracking device may identify one or more words that the customer speaks while the eye gaze direction of the customer is pointed at the product and determine that the vocal expression indicates a desire to buy the product. In some implementations, the customer tracking device may use an audio processing algorithm and/or speech recognition algorithm to identify the one or more words spoken by the customer to determine the vocal expression of the customer in relation to the product.

In some implementations, the customer tracking device may clean the audio data (e.g., process the audio data to remove background noise such as, speech of other customers, ambient noise of the physical retail location, music and/or public address sounds played at the physical retail location, and/or the like), before using the audio processing algorithm and/or speech recognition algorithm to identify the one or more words spoken by the customer to determine the vocal expression of the customer in relation to the product. In some implementations, cleaning the audio data may allow the customer tracking device to identify multiple voices of multiple customers, separate the multiple voices of the multiple customers, identify locations of the multiple customers, and/or match the multiple voices with the multiple customers. In some implementations, the customer tracking device may use an audio processing algorithm and/or speech recognition algorithm to clean the audio data.

In some implementations, the customer tracking device may simultaneously determine one or more vocal expressions of one or more customers in relation to one or more products at one or more physical retail locations. For example, the customer tracking device may determine the one or more vocal expressions of the one or more customers in relation to the one or more products at the one or more physical retail locations by identifying one or more words spoken by the one or more customers, respectively, at the same time.

Figure 1E:
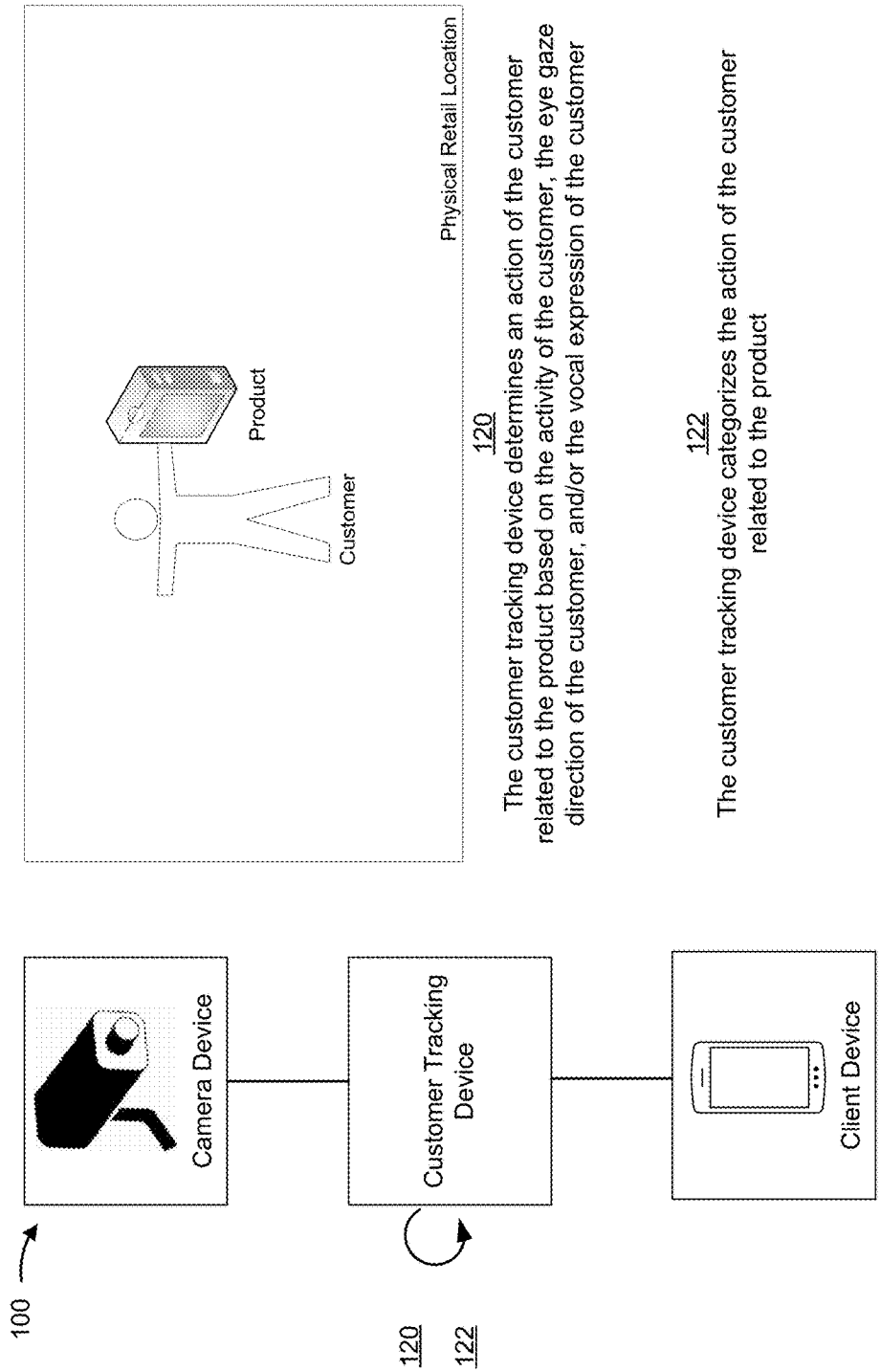

As shown in FIG. 1E and by reference number 120, the customer tracking device may determine an action of the customer in relation to the product. In some implementations, the customer tracking device may determine the action of the customer based on determining the activity of the customer in relation to the product, determining the eye gaze direction of the customer relative to the product, and/or determining the vocal expression of the customer in relation to the product. For example, the customer tracking device may determine that the customer stood and faced the product, picked up the product, and made a remark about the product based on determining the activity of the customer, determining the eye gaze direction of the customer, and determining the vocal expression of the customer. In some implementations, the action of the customer includes information related to the activity of the customer, the eye gaze direction of the customer, and/or the vocal expression of the customer. In some implementations, the action of the customer includes information related to the activity of the customer, the eye gaze direction of the customer, and/or the vocal expression of the customer for a period of time. For example, the customer tracking device may determine that the customer read the label of the product for five seconds, held the product for two seconds, and spoke the name of the product for one second.

In some implementations, the customer tracking device may determine whether the customer interacts with the product based on the activity of the customer in relation to the product. For example, the customer tracking device may determine that the customer has interacted with the product (e.g., by touching the product with a hand of the customer) based on the activity of the customer in relation to the product. In some implementations, the customer tracking device may determine the action of the customer by determining whether the customer interacts with the product, based on the activity of the customer. For example, the customer tracking device may determine that the customer has held the product based on determining that the customer interacted with the product by touching the product with the hand of the customer.

In some implementations, the customer tracking device may determine whether the customer interacts with the product for a first threshold period of time based on the activity of the customer in relation to the product and the first duration of time. For example, the customer tracking device may determine whether the customer holds the product for at least a specific amount of time (e.g., five seconds) based on determining that the customer interacted with the product by touching the product with the hand of the customer for a specific amount of time (e.g., ten seconds). In some implementations, the customer tracking device may determine that the customer interacts with the product for a first period of time based on the activity of the customer relative to the product and the first duration of time.

In some implementations, the customer tracking device may determine whether the customer looks at the product based on the eye gaze direction of the customer in relation to the product. For example, the customer tracking device may determine that the customer has looked at the product (e.g., by having the eye gaze direction of the customer pointed at the product) based on the eye gaze direction of the customer in relation to the product. In some implementations, the customer tracking device may determine the action of the customer by determining whether the customer looks at the product, based on the eye gaze direction of the customer. For example, the customer tracking device may determine that the customer has read the label of the product based on determining that the customer has looked at the product by having the eye gaze direction of the customer pointed at the product. In some implementations, the customer tracking device may determine that the customer has read information associated with the product, wherein the information is printed on the product.

In some implementations, the customer tracking device may determine whether the customer looks at the product for a second threshold period of time based on the eye gaze direction of the customer in relation to the product and the second duration of time. For example, the customer tracking device may determine whether the customer looks at the product for at least a specific amount of time (e.g., three seconds) based on determining that the eye gaze direction of the customer was pointed at the product for a specific amount of time (e.g., six seconds). In some implementations, the customer tracking device may determine that the customer looks at the product for a second period of time based on the eye gaze direction of the customer relative to the product and the second duration of time.

In some implementations, the customer tracking device may determine whether the customer speaks about the product based on the vocal expression of the customer in relation to the product. For example, the customer tracking device may determine that the customer has spoken about the product (e.g., by the customer reading words printed on the label of the product out loud) based on the vocal expression of the customer in relation to the product.

In some implementations, the customer tracking device may utilize a machine learning or artificial intelligence model to determine the action of the customer in relation to the product. For example, based on the model, the customer tracking device may assign a respective weight to the activity of the customer in relation to the product, the eye gaze direction of the customer relative to the product, and/or the vocal expression of the customer in relation to the product, as well as other factors, such as placement of the product at the physical retail location, the customer's proximity to the product at the physical retail location, and/or the like, to determine the action of the customer in relation to the product. In this way, the customer tracking device may determine the action of the customer in relation to the product in a manner that optimizes the processing resources of the customer tracking device.

In some implementations, the customer tracking device may train the model based on an artificial intelligence approach, such as a machine learning algorithm, a neural network algorithm, or another type of artificial intelligence approach. To train the model based on the artificial intelligence approach, the customer tracking device may use a training set of known inputs (e.g., inputs concerning an activity of a customer in relation to a product, an eye gaze direction of a customer relative to a product, a vocal expression of a customer in relation to a product, and/or the like) and known outputs corresponding to the inputs (e.g., outputs concerning a determination that a customer interacts with a product by: holding the product, looking at the product, talking about the product, and/or the like). For example, the customer tracking device may train the model based on a training set of data that includes an input group (e.g., past inputs relating to an activity of a customer in relation to a product, an eye gaze direction of a customer relative to a product, a vocal expression of a customer in relation to a product, and/or the like) and an output group (e.g., past outputs relating to a determination that a customer interacts with a product by: holding the product, looking at the product, talking about the product, and/or the like), where each input group corresponds to an optimal output group, such as an optimal determination of an action of a customer in relation to the product. In some implementations, another device may train the model and provide the model for use by the customer tracking device.

In some implementations, the artificial intelligence approach may identify relationships between the known inputs and the known outputs, and may configure parameters corresponding to the relationships. For example, the model may process the training set of data and create general rules for determining an action of a customer in relation to a product based on the activity of the customer in relation to the product, the eye gaze direction of the customer relative to the product, and/or the vocal expression of the customer in relation to the product. In some implementations, the model may be used to generate a score that indicates an amount of interest a customer has in a product.

In some implementations, the customer tracking device may update the model based on the artificial intelligence approach. For example, the customer tracking device may use a testing set of known inputs (e.g., inputs concerning an activity of a customer in relation to a product, an eye gaze direction of the customer relative to a product, a vocal expression of a customer in relation to a product, and/or the like) and target outputs corresponding to the known outputs (e.g., outputs concerning a determination that a customer interacts with a product by: holding the product, looking at the product, talking about the product, and/or the like). The target outputs may be outputs that are known to be optimal. The customer tracking device may input, to the model, the known inputs of the testing set, and the model may output observed outputs. The customer tracking device may compare the target outputs and the observed outputs, and may reconfigure the parameters of the model based on the artificial intelligence algorithm. In this way, the customer tracking device may improve accuracy of the model based on iteratively improving accuracy of parameters of the model.

In some implementations, the customer tracking device may use the trained and updated model to determine an action of a customer in relation to the product. For example, the customer tracking device may specify an activity of a customer in relation to the product, an eye gaze direction of the customer relative to the product, and/or a vocal expression of the customer in relation to the product as inputs to the model. The model may then output information identifying a determination of the action of the customer in relation to the product, possibly with a corresponding score that indicates an amount of interest the customer has in the product.

In this way, the customer tracking device may deliver an optimized process for determining an action of a customer in relation to a product in a manner that conserves computing resources (e.g., processor resources, memory resources, and/or the like), which would otherwise be wasted performing an inefficient and/or time consuming process.

As shown by reference number 122, the customer tracking device may determine a category for the action of the customer. In some implementations, the category may indicate a type of interaction of the customer with the product. For example, the category may indicate whether the action of the customer in relation to the product is tactile (e.g., based on the activity of the customer), visual (e.g., based on the eye gaze direction of the customer), and/or auditory (e.g., based on the vocal expression of the customer).

Figure 1F:
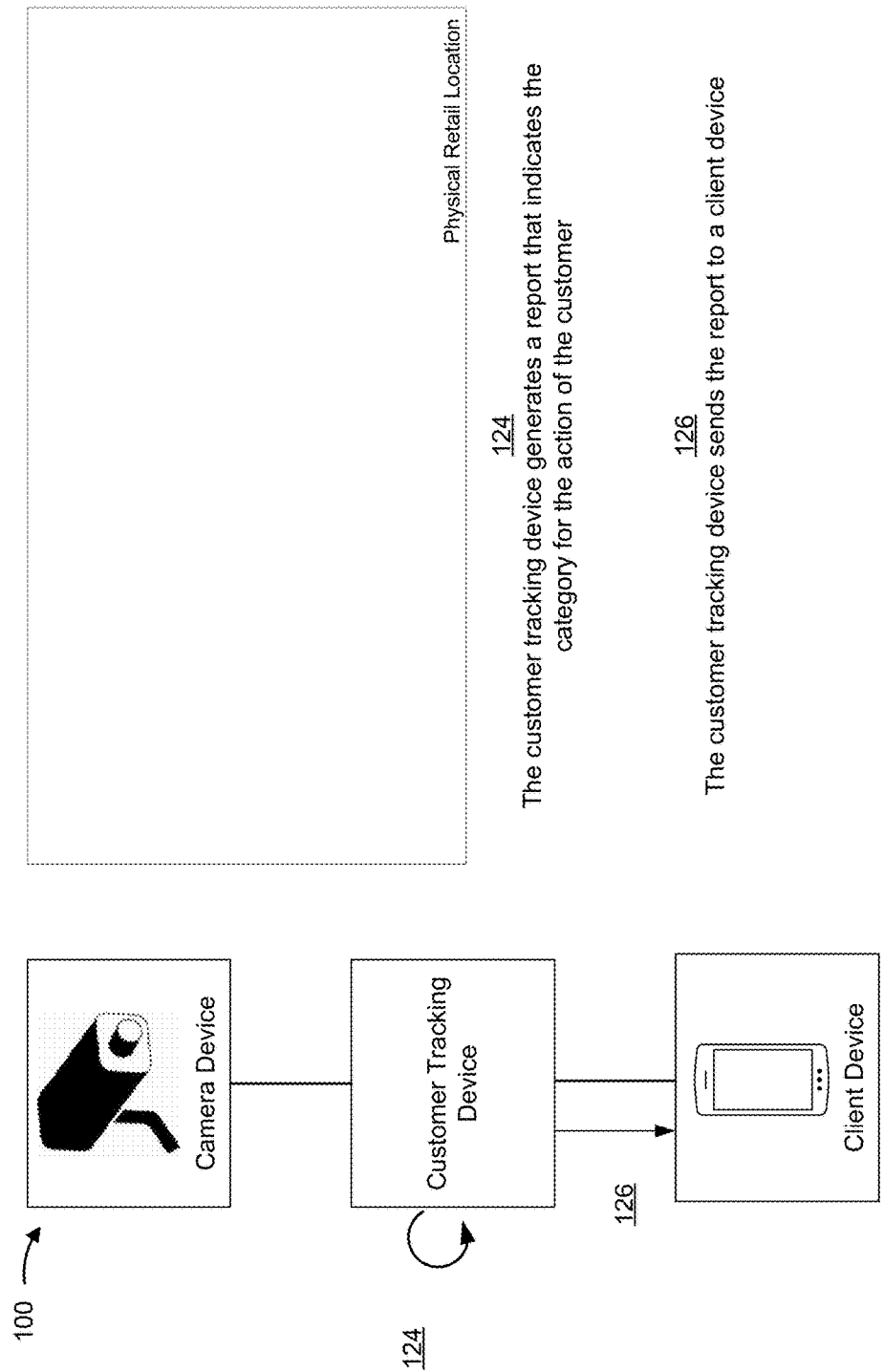

As shown in FIG. 1F and by reference number 124, the customer tracking device may generate a report that indicates the category for the action of the customer. For example, the report may indicate the action of the customer (e.g., the customer held the product for a threshold period of time) and the category (e.g., a tactile action). In some implementations, the report may include information concerning the score that indicates the amount of interest the customer has in the product (e.g., likely to buy the product, likely to consider buying the product in the future, unlikely to buy the product, and/or the like).

Additionally, or alternatively, in some implementations, the customer tracking device may determine a classification of the customer. For example, the classification may indicate a characteristic of the customer. In some implementations, the customer tracking device may determine a classification of the customer based on the image data, the video data, and/or the audio data. For example, the classification may indicate a demographic of the customer (e.g., an age, a race, an ethnicity, a gender, and/or the like of the customer). In some implementations, the customer tracking device may use a demographic classification algorithm on the image data, the video data, and/or the audio data to determine a classification of the customer, while keeping the customer's identity anonymous. In some implementations, the customer tracking device may add and/or include information (e.g., second information) that indicates the classification of the customer in the report.

In some implementations, the customer tracking device may generate statistics regarding one or more customers based on one or more actions of the one or more customers, one or more categories of the one or more customers, and/or one or more classifications of the one or more customers. For example, the statistics may indicate that a specific percentage of male customers (e.g., 25%) had a visual interaction with a product and read the label of the product for over a threshold amount of time (e.g., three seconds). In some implementations, the customer tracking device may generate product recommendations regarding one or more products based on one or more actions of the one or more customers, one or more categories of the one or more customers, and/or one or more classifications of the one or more customers. For example, the product recommendations may concern placement of a product at a physical retail location (e.g., such as placing the product on a different shelf, in a different aisle, at a different section of the physical retail location, and/or the like), presentation of the product (e.g., changing the labeling of the product, packaging of the product, advertising of the product, security features of the product, and/or the like), inventory of the product (e.g., ordering and/or restock the product at a specific time and/or on a schedule), and/or the like. In some implementations, the customer tracking device may include the statistics and product recommendations in the report.

Additionally, or alternatively, in some implementations, the customer tracking device may automatically perform one or more actions based on the product recommendations. For example, a first action of the one or more actions may specify an order for an additional amount of a product (e.g., purchase additional units of the product). As another example, a second action of the one or more actions may stop an order of a product (e.g., cancel delivery and/or purchase of the product). As a further example, a third action of the one or more actions may specify an order to change the placement of the product (e.g., change the placement of the product at the physical retail location, such as placing the product on a different shelf, in a different aisle, at a different section of the physical retail location, and/or the like). In some implementations, the customer tracking device may automatically execute the one or more actions. For example, the customer tracking device may execute the first instruction to order the additional amount of the product, execute the second instruction to stop an order of the product, and/or execute the third instruction to change the placement of the product (e.g., by deploying a robot and/or drone to change the placement of the product). In some implementations, the customer tracking device may include instructions concerning the one or more actions with the report, such that the one or more actions may be executed by a device that receives the report.

As shown by reference number 126, the customer tracking device may send the report to a client device. In some implementations, the customer tracking device may send the report to the client device to permit the client device to display the report at the client device. For example, the customer tracking device may send the report to the client device to permit the client device to display the report on a user interface of the client device. In some implementations, the client device may receive the report and execute the one or more actions by processing the instructions included in the report.

This description is applicable to implementations that include one or more customers and one or more products at one or more physical retail locations. For example, the camera device may capture and/or record image data, video data, and/or audio data concerning one or more customers (e.g., one customer, ten customers, one hundred customers, and/or the like) in relation to one or more products (e.g., one product, ten products, one hundred products, and/or the like) at one or more physical retail locations (e.g., one physical retail location, ten physical retail locations, one hundred physical retail locations, and/or the like). The customer tracking device may process the image data, the video data, and/or the audio data as described above, which may require determining numerous (e.g., hundreds, thousands, millions, and/or the like) actions of the one or more customers in relation to the one or more products at the one or more physical retail locations at the same time. In this way, the process for determining actions of multiple customers in relation to multiple products at multiple physical retail locations is automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to automatically determine actions of multiple customers in relation to multiple products at multiple physical retail locations. Finally, automating the process for determining actions of multiple customers in relation to multiple products at multiple physical retail locations conserves computing resources (e.g., processor resources, memory resources, and/or the like) that would otherwise be wasted in attempting to assist a human in determining actions of multiple customers in relation to multiple products at multiple physical retail locations by hand.

As indicated above, FIGS. 1A-1F are provided merely as examples. Other examples are possible and may differ from what was described with regard to FIGS. 1A-1F.

Figure 2:
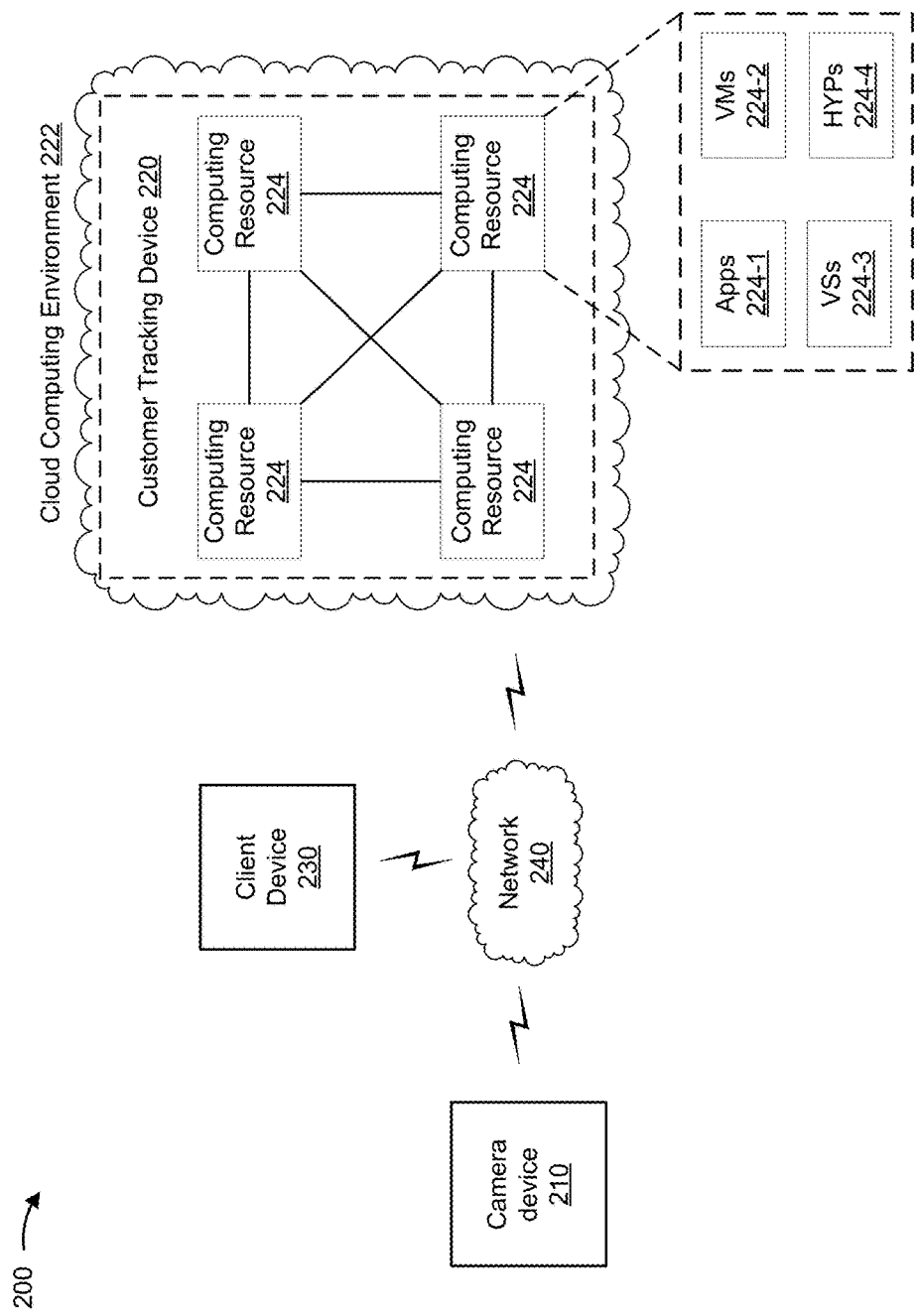
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include camera device 210, customer tracking device 220, client device 230, and network 240. Devices of environment 200 may interconnect via wired connections, wireless connections, or a combination of wired and wireless connections.

Camera device 210 includes one or more devices capable of capturing, receiving, generating, storing, processing, and/or providing information associated with one or more images (e.g., photographs), video, and/or audio. For example, camera device 210 may include a digital still camera, analog still camera, digital video camera, analog video camera, a microphone, or a communication and/or computing device in communication with a camera, such as a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), a server device, a group of server devices, a cloud computing device, a data center device, or a similar type of device. Camera device 210 may include hardware, or a combination of hardware and software, that enables camera device 210 to capture image data, video data, and/or audio data and transmit the image data, the video data, and/or the audio data to another device or devices, such as customer tracking device 220 and/or client device 230. In some implementations, camera device 210 may be fixed to a particular location (e.g., at a place of business), and in some implementations, camera device 210 may be affixed to a person and/or a product (e.g., by a wearable communication device, tablet computer, and/or the like).

Customer tracking device 220 includes one or more devices capable of receiving, generating, storing, processing, and/or providing information associated with image, video, audio, customer, product, and/or location data. For example, customer tracking device 220 may include a server device (e.g., a host server, a web server, an application server, etc.), a data center device, or a similar device. Customer tracking device 220 is capable of receiving image data, video data, and/or audio data from camera device 210, determining an action of a customer in relation to a product in a physical retail location, determining a category for the action of the customer in relation to the product, generating a report that indicates the category for the action of the customer in relation to the product, sending the report to client device 230, and/or the like.

In some implementations, as shown, customer tracking device 220 may be hosted in cloud computing environment 222. Notably, while implementations described herein describe customer tracking device 220 as being hosted in cloud computing environment 222, in some implementations, customer tracking device 220 might not be cloud-based (i.e., may be implemented outside of a cloud computing environment) or might be partially cloud-based.

Cloud computing environment 222 includes an environment that delivers computing as a service, whereby shared resources, services, etc. may be provided to customer tracking device 220. Cloud computing environment 222 may provide computation, software, data access, storage, and/or other services that do not require end-user knowledge of a physical location and configuration of a system and/or a device that delivers the services.

Computing resource 224 includes one or more personal computers, workstation computers, server devices, or another type of computation and/or communication device. In some implementations, computing resource 224 may host customer tracking device 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 may include a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by one or more devices, such as camera device 210, customer tracking device 220, and/or client device 230. Application 224-1 may eliminate a need to install and execute the software applications on devices, such as camera device 210 and/or client device 230. For example, application 224-1 may include software associated with customer tracking device 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., client device 230), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Client device 230 includes one or more devices capable of receiving, generating, storing, processing, and/or providing information associated with customer, product, and/or location data. For example, client device 230 may include a communication and/or computing device, such as a mobile phone (e.g., a smart phone, a radiotelephone, etc.), a laptop computer, a tablet computer, a handheld computer, a desktop computer, a server device, a group of server devices, a cloud computing device, a data center device, a gaming device, a wearable communication device (e.g., a smart wristwatch, a pair of smart eyeglasses, etc.), or a similar type of device. Client device 230 may include hardware, or a combination of hardware and software, that is capable of receiving, storing, and/or displaying information, such as information received from customer tracking device 220.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
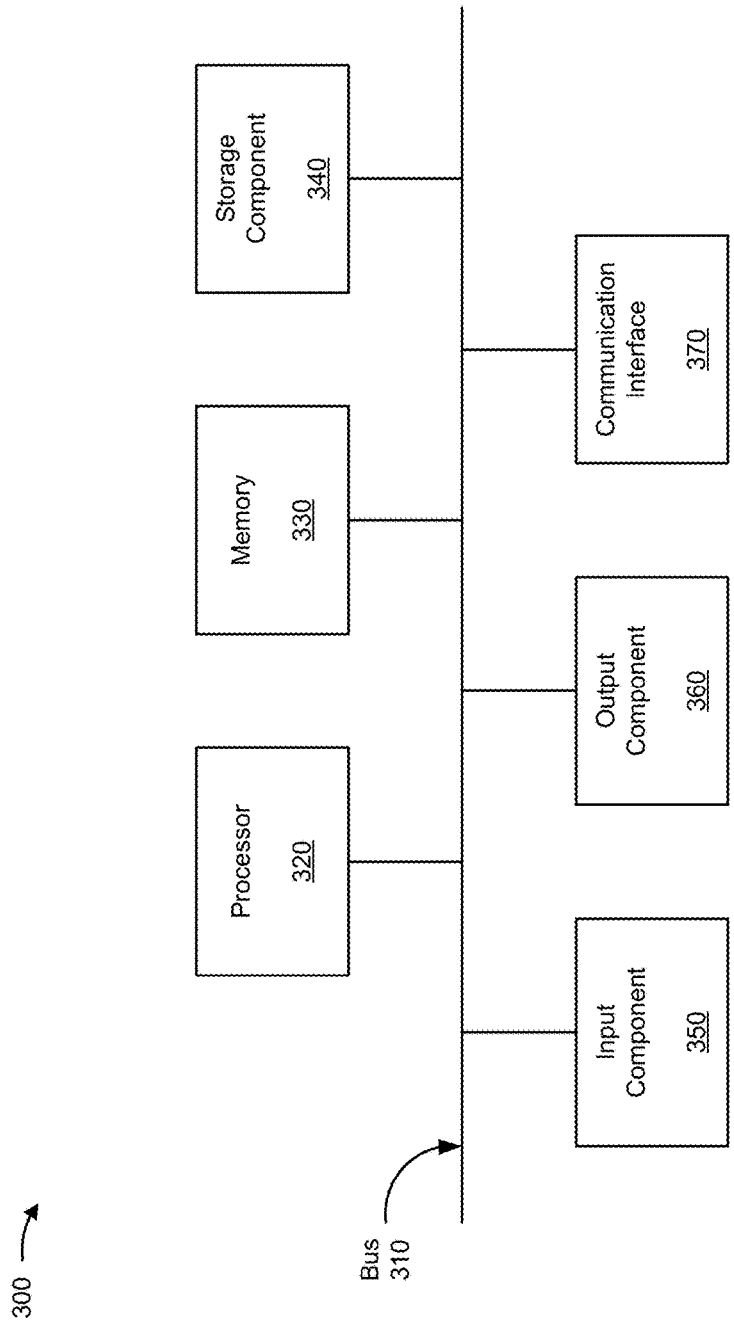
FIG. 3 is a diagram of example components of one or more devices of FIG. 2.

FIG. 3 is a diagram of example components of a device 300. Device 300 may correspond to camera device 210, customer tracking device 220, and/or client device 230. In some implementations, camera device 210, customer tracking device 220, and/or client device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for determining an action of a customer in relation to a product. In some implementations, one or more process blocks of FIG. 4 may be performed by a customer tracking device (e.g., customer tracking device 220). In some implementations, one or more process blocks of FIG. 4 may be performed by another device or a group of devices separate from or including the customer tracking device, such as a camera device (e.g., camera device 210) or a client device (e.g., client device 230).

As shown in FIG. 4, process 400 may include receiving input that comprises first information, wherein the first information includes video data concerning a plurality of customers and a product in a plurality of physical retail locations (block 410). For example, the customer tracking device (e.g., using computing resource 224, processor 320, memory 330, storage component 340, input component 350, communication interface 370, and/or the like) may receive input that comprises first information, as described above in connection with FIGS. 1A-1F. In some implementations, the first information includes video data concerning a plurality of customers and a product in a plurality of physical retail locations.

As further shown in FIG. 4, process 400 may include parsing the input to identify the video data (block 420). For example, the customer tracking device (e.g., using computing resource 224, processor 320, memory 330, storage component 340, and/or the like) may parse the input to identify the video data, as described above in connection with FIGS. 1A-1F.

As further shown in FIG. 4, process 400 may include processing the video data to identify the plurality of customers and the product in the plurality of physical retail locations (block 430). For example, the customer tracking device (e.g., using computing resource 224, processor 320, memory 330, storage component 340, communication interface 370, and/or the like) may process the video data to identify the plurality of customers and the product in the plurality of physical retail locations, as described above in connection with FIGS. 1A-1F As further shown in FIG. 4, process 400 may include determining actions of the plurality of customers in relation to the product in the plurality of physical retail locations, wherein determining the actions of the plurality of customers in relation to the product in the plurality of physical retail locations includes: determining, for a customer of the plurality of customers, an activity of the customer in relation to the product, and determining, for the customer, an eye gaze direction of the customer relative to the product (block 440). For example, the customer tracking device (e.g., using computing resource 224, processor 320, memory 330, storage component 340, communication interface 370, and/or the like) may determine actions of the plurality of customers in relation to the product in the plurality of physical retail locations, as described above in connection with FIGS. 1A-1F. In some implementations, determining the actions of the plurality of customers in relation to the product in the plurality of physical retail locations includes: determining, for a customer of the plurality of customers, an activity of the customer in relation to the product, and determining, for the customer, an eye gaze direction of the customer relative to the product.

As further shown in FIG. 4, process 400 may include determining categories for the actions of the plurality of customers in relation to the product (block 450). For example, the customer tracking device (e.g., using computing resource 224, processor 320, memory 330, storage component 340, communication interface 370, and/or the like) may determine categories for the actions of the plurality of customers in relation to the product, as described above in connection with FIGS. 1A-1F.

As further shown in FIG. 4, process 400 may include generating a report that indicates one or more of the categories for the actions of the plurality of customers in relation to the product (block 460). For example, the customer tracking device (e.g., using computing resource 224, processor 320, memory 330, storage component 340, communication interface 370, and/or the like) may generate a report that indicates one or more of the categories for the actions of the plurality of customers in relation to the product, as described above in connection with FIGS. 1A-1F As further shown in FIG. 4, process 400 may include sending the report to a client device to permit the client device to display the report (block 470). For example, the customer tracking device (e.g., using computing resource 224, processor 320, memory 330, storage component 340, output component 360, communication interface 370, and/or the like) may send the report to a client device to permit the client device to display the report as described above in connection with FIGS. 1A-1F.

Process 400 may include additional implementations, such as any single implementation or any combination of implementations described below and/or in connection with one or more other processes described elsewhere herein.

In some implementations, when determining, for the customer of the plurality of customers, the activity of the customer in relation to the product, the customer tracking device may identify one or more body parts of the customer, track movement of the one or more body parts of the customer, and determine the activity of the customer in relation to the product based on the movement of the one or more body parts of the customer. In some implementations, when determining, for the customer, the eye gaze direction of the customer relative to the product, the customer tracking device may identify one or more eyes of the customer, track movement of the one or more eyes of the customer, and determine the eye gaze direction of the customer relative to the product based on the movement of the one or more eyes of the customer.

In some implementations, when determining the actions of the plurality of customers in relation to the product in the plurality of physical retail locations, the customer tracking device may determine, for the customer of the plurality of customers, whether the customer interacts with the product based on the activity of the customer in relation to the product, and determine, for the customer, whether the customer looks at the product based on the eye gaze direction of the customer relative to the product.

In some implementations, when generating the report that indicates the one or more of the categories for the actions of the plurality of customers in relation to the product, the customer tracking device may determine classifications of the plurality of customers based on the video data, and include second information that indicates one or more classifications of the plurality of customers in the report. In some implementations, the classifications of the plurality of customers indicate demographics of the plurality of customers.

In some implementations, the categories for the actions of the plurality of customers in relation to the product indicate types of interactions of the plurality of customers with the product.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 determining an action of a customer in relation to a product. In some implementations, one or more process blocks of FIG. 5 may be performed by a customer tracking device (e.g., customer tracking device 220). In some implementations, one or more process blocks of FIG. 5 may be performed by another device or a group of devices separate from or including the customer tracking device, such as a camera device (e.g., camera device 210) or a client device (e.g., client device 230).

As shown in FIG. 5, process 500 may include receiving input that comprises video data concerning multiple customers and a product at a physical retail location (block 510). For example, the customer tracking device (e.g., using computing resource 224, processor 320, memory 330, storage component 340, input component 350, communication interface 370, and/or the like) may receive input that comprises video data concerning multiple customers and a product at a physical retail location, as described above in connection with FIGS. 1A-1F.

As further shown in FIG. 5, process 500 may include parsing the input to identify the video data (block 520). For example, the customer tracking device (e.g., using computing resource 224, processor 320, memory 330, storage component 340, and/or the like) may parse the input to identify the video data, as described above in connection with FIGS. 1A-1F.

As further shown in FIG. 5, process 500 may include processing the video data to identify the multiple customers and the product at the physical retail location (block 530). For example, the customer tracking device (e.g., using computing resource 224, processor 320, memory 330, storage component 340, communication interface 370, and/or the like) may process the video data to identify the multiple customers and the product at the physical retail location, as described above in connection with FIGS. 1A-1F.

As further shown in FIG. 5, process 500 may include determining actions of the multiple customers in relation to the product at the physical retail location, wherein, when determining the actions of the multiple customers in relation to the product at the physical retail location: determine, for a customer of the multiple customers, an activity of the customer in relation to the product and a first duration of time associated with the activity of the customer in relation to the product, and determine, for the customer, an eye gaze direction of the customer relative to the product and a second duration of time associated with the eye gaze direction of the customer relative to the product (block 540). For example, the customer tracking device (e.g., using computing resource 224, processor 320, memory 330, storage component 340, communication interface 370, and/or the like) may determine actions of the multiple customers in relation to the product at the physical retail location, as described above in connection with FIGS. 1A-1F. In some implementations, when determining the actions of the multiple customers in relation to the product at the physical retail location, the customer tracking device may: determine, for a customer of the multiple customers, an activity of the customer in relation to the product and a first duration of time associated with the activity of the customer in relation to the product, and determine, for the customer, an eye gaze direction of the customer relative to the product and a second duration of time associated with the eye gaze direction of the customer relative to the product.

As further shown in FIG. 5, process 500 may include determining categories for the actions of the multiple customers in relation to the product (block 550). For example, the customer tracking device (e.g., using computing resource 224, processor 320, memory 330, storage component 340, communication interface 370, and/or the like) may determine categories for the actions of the multiple customers in relation to the product, as described above in connection with FIGS. 1A-1F.

As further shown in FIG. 5, process 500 may include generating a report that indicates one or more of the categories for the actions of the multiple customers in relation to the product (block 560). For example, the customer tracking device (e.g., using computing resource 224, processor 320, memory 330, storage component 340, communication interface 370, and/or the like) may generate a report that indicates one or more of the categories for the actions of the multiple customers in relation to the product, as described above in connection with FIGS. 1A-1F.

As further shown in FIG. 5, process 500 may include sending the report to a client device to permit the client device to display the report at the client device (block 570). For example, the customer tracking device (e.g., using computing resource 224, processor 320, memory 330, storage component 340, output component 360, communication interface 370, and/or the like) may send the report to a client device to permit the client device to display the report at the client device, as described above in connection with FIGS. 1A-1F.

Process 500 may include additional implementations, such as any single implementation or any combination of implementations described below and/or in connection with one or more other processes described elsewhere herein.

In some implementations, when determining, for the customer of the multiple customers, the activity of the customer in relation to the product and the first duration of time associated with the activity of the customer in relation to the product, the customer tracking device may identify one or more body parts of the customer, track movement of the one or more body parts of the customer, determine the activity of the customer in relation to the product based on the movement of the one or more body parts of the customer, and determine the first duration of time associated with the activity of the customer in relation to the product based on the movement of the one or more body parts of the customer for a period of time. In some implementations, when determining, for the customer, the eye gaze direction of the customer relative to the product and the second duration of time associated with the eye gaze direction of the customer relative to the product, the customer tracking device may: identify one or more eyes of the customer, track movement of the one or more eyes of the customer, determine the eye gaze direction of the customer relative to the product based on the movement of the one or more eyes of the customer, and determine the second duration of time associated with the eye gaze direction of the customer relative to the product based on the movement of the one or more eyes of the customer for a period of time.

In some implementations, when determining the actions of the multiple customers in relation to the product at the physical retail location, the customer tracking device may determine, for the customer of the multiple customers, whether the customer interacts with the product for a first threshold period of time based on the activity of the customer in relation to the product and the first duration of time, and determine, for the customer, whether the customer looks at the product for a second threshold period of time based on the eye gaze direction of the customer in relation to the product and the second duration of time.

In some implementations, when determining the actions of the multiple customers in relation to the product at the physical retail location, the customer tracking device may determine, for the customer of the multiple customers, that the customer interacts with the product for a first period of time based on the activity of the customer relative to the product and the first duration of time, and determine, for the customer, that the customer looks at the product for a second period of time based on the eye gaze direction of the customer relative to the product and the second duration of time. In some implementations, when determining, for the customer of the multiple customers, that the customer interacts with the product for the first period of time based on the activity of the customer relative to the product and the first duration of time, the customer tracking device may determine that the customer has touched the product with a hand of the customer. In some implementations, when determining, for the customer, that the customer looks at the product for the second period of time based on the eye gaze direction of the customer relative to the product and the second duration of time, the customer tracking device may determine that the customer has read information associated with the product, wherein the information is printed on the product.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for determining an action of a customer in relation to a product. In some implementations, one or more process blocks of FIG. 6 may be performed by a customer tracking device (e.g., customer tracking device 220). In some implementations, one or more process blocks of FIG. 6 may be performed by another device or a group of devices separate from or including the customer tracking device, such as a camera device (e.g., camera device 210) or a client device (e.g., client device 230).

As shown in FIG. 6, process 600 may include receiving input that comprises first information and second information, wherein the first information includes video data concerning a plurality of customers and multiple products at a physical retail location and the second information includes audio data concerning utterances of the plurality of customers at the physical retail location (block 610). For example, the customer tracking device (e.g., using computing resource 224, processor 320, memory 330, storage component 340, input component 350, communication interface 370, and/or the like) may receive input that comprises first information and second information, as described above in connection with FIGS. 1A-1F. In some implementations, the first information includes video data concerning a plurality of customers and multiple products at a physical retail location and the second information includes audio data concerning utterances of the plurality of customers at the physical retail location.

As further shown in FIG. 6, process 600 may include parsing the input to identify the video data and the audio data (block 620). For example, the customer tracking device (e.g., using computing resource 224, processor 320, memory 330, storage component 340, and/or the like) may parse the input to identify the video data and the audio data, as described above in connection with FIGS. 1A-1F.

As further shown in FIG. 6, process 600 may include processing the video data and the audio data to identify the plurality of customers and the multiple products at the physical retail location, and the utterances of the plurality of customers at the physical retail location (block 630). For example, the customer tracking device (e.g., using computing resource 224, processor 320, memory 330, storage component 340, communication interface 370, and/or the like) may process the video data and the audio data to identify the plurality of customers and the multiple products at the physical retail location, and the utterances of the plurality of customers at the physical retail location, as described above in connection with FIGS. 1A-1F.

As further shown in FIG. 6, process 600 may include determining actions of the plurality of customers in relation to the multiple products in the physical retail location, wherein, when determining the actions of the plurality of customers in relation to the multiple products in the physical retail location: determine, for a customer of the plurality of customers, an activity of the customer in relation to a product of the multiple products, determine, for the customer, an eye gaze direction of the customer in relation to the product, and determine, for the customer, a vocal expression of the customer in relation to the product (block 640). For example, the customer tracking device (e.g., using computing resource 224, processor 320, memory 330, storage component 340, communication interface 370, and/or the like) may determine actions of the plurality of customers in relation to the multiple products in the physical retail location, as described above in connection with FIGS. 1A-1F. In some implementations, the customer tracking device, when determining the actions of the plurality of customers in relation to the multiple products in the physical retail location, may: determine, for a customer of the plurality of customers, an activity of the customer in relation to a product of the multiple products, determine, for the customer, an eye gaze direction of the customer in relation to the product, and determine, for the customer, a vocal expression of the customer in relation to the product.

As further shown in FIG. 6, process 600 may include determining categories for the actions of the plurality of customers in relation to the multiple products (block 650). For example, the customer tracking device (e.g., using computing resource 224, processor 320, memory 330, storage component 340, communication interface 370, and/or the like) may determine categories for the actions of the plurality of customers in relation to the multiple products, as described above in connection with FIGS. 1A-1F.

As further shown in FIG. 6, process 600 may include generating a report that indicates one or more of the categories for the actions of the plurality of customers in relation to the multiple products (block 660). For example, the customer tracking device (e.g., using computing resource 224, processor 320, memory 330, storage component 340, communication interface 370, and/or the like) may generate a report that indicates one or more of the categories for the actions of the plurality of customers in relation to the multiple products, as described above in connection with FIGS. 1A-1F.

As further shown in FIG. 6, process 600 may include sending the report to a client device to permit the client device to display the report (block 670). For example, the customer tracking device (e.g., using computing resource 224, processor 320, memory 330, storage component 340, output component 360, communication interface 370, and/or the like) may send the report to a client device to permit the client device to display the report at the client device, as described above in connection with FIGS. 1A-1F.

Process 600 may include additional implementations, such as any single implementation or any combination of implementations described below and/or in connection with one or more other processes described elsewhere herein.

In some implementations, when determining, for the customer, the vocal expression of the customer in relation to the product, the customer tracking device may identify, for the customer, one or more words spoken by the customer in relation to the product, and determine the vocal expression of the customer in relation to the product based on the one or more words spoken by the customer in relation to the product. In some implementations, when determining the actions of the plurality of customers in relation to the multiple products in the physical retail location, the customer tracking device may determine, for the customer, whether the customer interacts with the product based on the activity of the customer in relation to the product, determine, for the customer, whether the customer looks at the product based on the eye gaze direction of the customer in relation to the product, and determine, for the customer, whether the customer speaks about the product based on the vocal expression of the customer in relation to the product. In some implementations, the categories for the actions of the plurality of customers in relation to the multiple products may indicate whether the actions of the plurality of customers in relation to the multiple products are tactile, visual, or auditory.

In some implementations, when generating the report that indicates the one or more of the categories for the actions of the plurality of customers in relation to the multiple products, the customer tracking device may determine classifications of the plurality of customers based on the video data and/or the audio data, and add information that indicates one or more of the classifications of the plurality of customers to the report. In some implementations, the classifications of the plurality of customers may indicate characteristics of the plurality of customers.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, input that comprises video data concerning a plurality of customers and a product in a plurality of physical retail locations;
   processing, by the device, the video data to identify the plurality of customers and the product in the plurality of physical retail locations;
   determining, by the device, actions of the plurality of customers in relation to the product in the plurality of physical retail locations,
   wherein determining the actions of the plurality of customers in relation to the product in the plurality of physical retail locations includes:
      identifying one or more eyes of a customer of the plurality of customers,
      tracking movement of the one or more eyes of the customer,
      determining an eye gaze direction of the customer relative to the product based on the movement of the one or more eyes of the customer,
      determining a duration of time associated with the eye gaze direction of the customer relative to the product based on the movement of the one or more eyes of the customer, and
      determining, for the customer, an action, of the actions of the plurality of customers, based on the eye gaze direction of the customer relative to the product and the duration of time associated with the eye gaze direction of the customer relative to the product;
   determining, by the device, categories for the actions of the plurality of customers in relation to the product;
   generating, by the device, a report that indicates one or more of the categories for the actions of the plurality of customers in relation to the product; and
   sending, by the device, the report to a client device to permit the client device to display the report.

2. The method of claim 1, wherein determining the actions of the plurality of customers in relation to the product in the plurality of physical retail locations further includes:
   identifying one or more body parts of the customer;
   tracking movement of the one or more body parts of the customer; and
   determining an activity of the customer in relation to the product based on the movement of the one or more body parts of the customer.

3. The method of claim 1, wherein determining the actions of the plurality of customers in relation to the product in the plurality of physical retail locations further comprises:
   determining, for the customer of the plurality of customers, whether the customer interacts with the product based on an activity of the customer in relation to the product; and
   determining, for the customer, whether the customer looks at the product based on the eye gaze direction of the customer relative to the product.

4. The method of claim 1, wherein generating the report that indicates the one or more of the categories for the actions of the plurality of customers in relation to the product comprises:
   determining classifications of the plurality of customers based on the video data; and
   including second information that indicates one or more classifications of the plurality of customers in the report.

5. The method of claim 4, wherein the classifications of the plurality of customers indicate demographics of the plurality of customers.

6. The method of claim 1, wherein the categories for the actions of the plurality of customers in relation to the product indicate types of interactions of the plurality of customers with the product.

7. The method of claim 1, wherein the input is received from a video device associated with a camera device associated with at least one physical retail location of the plurality of physical retail locations.

8. A device comprising:
   one or more memory devices; and
   one or more processors, communicatively coupled to the one or more memory devices, to:
   receive input that comprises video data concerning multiple customers and a product at a physical retail location;
   parse the input to identify the video data;
   process the video data to identify the multiple customers and the product at the physical retail location;
   determine actions of the multiple customers in relation to the product at the physical retail location,
   wherein, when determining the actions of the multiple customers in relation to the product at the physical retail location, the one or more processors are to:
      determine, for a customer of the multiple customers, an activity of the customer in relation to the product and a first duration of time associated with the activity of the customer in relation to the product, and
      determine, for the customer, an eye gaze direction of the customer relative to the product and a second duration of time associated with the eye gaze direction of the customer relative to the product,
      wherein the one or more processors, when determining, for the customer, the eye gaze direction of the customer relative to the product and the second duration of time associated with the eye gaze direction of the customer relative to the product, are to:
  identify one or more eyes of the customer;
  track movement of the one or more eyes of the customer;
  determine the eye gaze direction of the customer relative to the product based on the movement of the one or more eyes of the customer; and
  determine the second duration of time associated with the eye gaze direction of the customer relative to the product based on the movement of the one or more eyes of the customer for a period of time;
determine categories for the actions of the multiple customers in relation to the product;
generate a report that indicates one or more of the categories for the actions of the multiple customers in relation to the product; and
send the report to a client device to permit the client device to display the report at the client device.

9. The device of claim 8, wherein the one or more processors, when determining, for the customer of the multiple customers, the activity of the customer in relation to the product and the first duration of time associated with the activity of the customer in relation to the product, are to:
  identify one or more body parts of the customer;
  track movement of the one or more body parts of the customer;
  determine the activity of the customer in relation to the product based on the movement of the one or more body parts of the customer; and
  determine the first duration of time associated with the activity of the customer in relation to the product based on the movement of the one or more body parts of the customer for a period of time.

10. The device of claim 8, wherein the one or more processors, when determining the actions of the multiple customers in relation to the product at the physical retail location, are to:
  determine, for the customer of the multiple customers, whether the customer interacts with the product for a first threshold period of time based on the activity of the customer in relation to the product and the first duration of time; and
  determine, for the customer, whether the customer looks at the product for a second threshold period of time based on the eye gaze direction of the customer in relation to the product and the second duration of time.

11. The device of claim 8, wherein the one or more processors, when determining the actions of the multiple customers in relation to the product at the physical retail location, are to:
  determine, for the customer of the multiple customers, that the customer interacts with the product for a first period of time based on the activity of the customer relative to the product and the first duration of time; and
  determine, for the customer, that the customer looks at the product for a second period of time based on the eye gaze direction of the customer relative to the product and the second duration of time.

12. The device of claim 11, wherein the one or more processors, when determining, for the customer of the multiple customers, that the customer interacts with the product for the first period of time based on the activity of the customer relative to the product and the first duration of time, are to:
  determine that the customer has touched the product with a hand of the customer.

13. The device of claim 11, wherein the one or more processors, when determining, for the customer, that the customer looks at the product for the second period of time based on the eye gaze direction of the customer relative to the product and the second duration of time, are to:
  determine that the customer has read information associated with the product,
  wherein the information is printed on the product.

14. The device of claim 8, wherein the one or more processors, when determining the actions of the multiple customers in relation to the product at the physical retail location, are to:
  determine, for the customer, whether the customer looked at one or more of:
    the product,
    a product label associated with the product, or
    at another location not associated with the product or the product label.

15. A non-transitory computer-readable medium storing instructions, the instructions comprising:
  one or more instructions that, when executed by one or more processors, cause the one or more processors to:
    receive input that comprises:
      video data concerning a customer and a product at a physical retail location, and
      audio data concerning utterances of the customer at the physical retail location;
    process the video data and the audio data to identify the customer and the product at the physical retail location, and the utterances of the customer at the physical retail location;
    determine at least one action of the customer in relation to the product in the physical retail location,
      wherein the one or more instructions, that cause the one or more processors to determine the at least one action of the customer in relation to the product in the physical retail location, cause the one or more processors to:
        identify one or more eyes of the customer,
        track movement of the one or more eyes of the customer,
        determine, for the customer, an eye gaze direction relative to the product based on the movement of the one or more eyes of the customer,
        determine a duration of time associated with the eye gaze direction
        determine, for the customer, a vocal expression of the customer in relation to the product, and
        determine, based on the duration of time associated with the eye gaze direction and based on the vocal expression, the at least one action of the customer in relation to the product in the physical retail location;
    determine at least one category for the at least one action of the customer in relation to the product;
    generate a report that indicates one or more of the at least one category for the at least one action of the customer in relation to the product; and
    send the report to a client device to permit the client device to display the report at the client device.

16. The non-transitory computer-readable medium of claim 15, wherein the one or more instructions, that cause the one or more processors to determine, for the customer, the vocal expression of the customer in relation to the product, cause the one or more processors to:

identify, for the customer, one or more words spoken by the customer in relation to the product; and determine the vocal expression of the customer in relation to the product based on the one or more words spoken by the customer in relation to the product.

17. The non-transitory computer-readable medium of claim 16, wherein the one or more instructions, that cause the one or more processors to determine the at least one action of the customer in relation to the product in the physical retail location, cause the one or more processors to:

determine, for the customer, whether the customer interacts with the product based on an activity of the customer in relation to the product;

determine, for the customer, whether the customer looks at the product based on the eye gaze direction of the customer in relation to the product; and determine, for the customer, whether the customer speaks about the product based on the vocal expression of the customer in relation to the product.

18. The non-transitory computer-readable medium of claim 15, wherein the at least one category for the at least one action of the customer in relation to the product indicate whether the at least one action of the customer in relation to the product is tactile, visual, or auditory.

19. The non-transitory computer-readable medium of claim 15, wherein the one or more instructions, that cause the one or more processors to generate the report that indicates the at least one category for the at least one action of the customer in relation to the product, cause the one or more processors to:

determine a classification of the customer based on at least one of the video data or the audio data; and add information that indicates the classification of the customer to the report.

20. The non-transitory computer-readable medium of claim 19, wherein the classification of the customer indicates characteristics of the customer.

\* \* \* \* \*